United States Patent
Nakai

(10) Patent No.: US 9,871,360 B2
(45) Date of Patent: Jan. 16, 2018

(54) WIRE PROTECTING MEMBER

(71) Applicant: Sumitomo Wiring Systems, Ltd., Yokkaichi, Mie (JP)

(72) Inventor: Hirokazu Nakai, Mie (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 15/019,988

(22) Filed: Feb. 10, 2016

(65) Prior Publication Data

US 2016/0261102 A1    Sep. 8, 2016

(30) Foreign Application Priority Data

Mar. 2, 2015  (JP) ................................ 2015-040180

(51) Int. Cl.
  *H02G 3/00* (2006.01)
  *H02G 3/04* (2006.01)

(52) U.S. Cl.
  CPC ........... *H02G 3/263* (2013.01); *H02G 3/0481* (2013.01)

(58) Field of Classification Search
  CPC ..................................................... F16L 21/06
  USPC ...................... 174/72 A, 72 R, 22 R; 285/373
  See application file for complete search history.

(56) References Cited

U.S. PATENT DOCUMENTS

| | | | | |
|---|---|---|---|---|
| 2,261,948 A * | 11/1941 | Beach | ................... | F16L 21/005 114/21.1 |
| 3,006,663 A * | 10/1961 | Bowne | ................ | F16L 27/1133 285/233 |
| 3,682,503 A * | 8/1972 | Bloom | ................... | F16L 21/005 285/345 |
| 4,124,236 A * | 11/1978 | Guidry | ................ | F16L 25/0036 285/373 |
| 4,215,883 A * | 8/1980 | Brown, Sr. | ........... | F16L 21/005 285/236 |
| 4,248,459 A * | 2/1981 | Pate | ...................... | F16L 3/1236 174/665 |
| 5,072,972 A * | 12/1991 | Justice | ................. | F16L 25/0036 285/148.11 |
| 5,105,054 A * | 4/1992 | Kirma | ................... | H01B 7/0045 174/2 |
| 6,155,302 A * | 12/2000 | Fischerkeller | ..... | F02M 37/0017 138/109 |
| 6,523,230 B1 * | 2/2003 | Weinhold | ............ | F16L 25/0036 24/270 |
| 2003/0193186 A1 * | 10/2003 | Meinig | ................... | F16L 23/04 285/31 |
| 2011/0155458 A1 * | 6/2011 | Kato | .................... | B60R 16/0215 174/74 R |
| 2012/0270444 A1 | 10/2012 | Kawamura | | |

* cited by examiner

*Primary Examiner* — Chau N Nguyen
(74) *Attorney, Agent, or Firm* — Gerald E. Hespos; Michael J. Porco; Matthew T. Hespos

(57) ABSTRACT

It is aimed to enable the use of existing components even if the size of an exterior material is changed. A wire protecting member disclosed by this specification is a wire protecting member for accommodating and protecting wires to be routed in a vehicle inside and includes a corrugated tube having wires inserted therein, a clamp including an inserting portion having an inner diameter larger than an inner diameter in the case of inserting the corrugated tube therethrough without any clearance and configured to fix the corrugated tube to a vehicle, and an auxiliary clamp interposed between the corrugated tube and the inserting portion and configured to fix the corrugated tube to the inserting portion.

14 Claims, 3 Drawing Sheets

WIRE PROTECTING MEMBER

BACKGROUND

1. Field of the Invention

This invention relates to a wire protecting member.

2. Description of the Related Art

Japanese Utility Model Publication No. H05-12876 discloses an example of a pipe clamp to be mounted on pipes. This pipe clamp includes a plurality of holding portions for individually holding a plurality of pipes. The holding portion is formed with a plurality of arcuate grooves formed in accordance with a diameter of the pipe and the plurality of arcuate grooves are continuously formed in a height direction so that the pipe can be held at different heights. By doing so, the pipe can be held by any one of the arcuate grooves even if the height of the pipe differs.

Since the size of the pipe is determined by the size of a wire to be inserted through the pipe, the diameter of the pipe becomes smaller if the size of the wire becomes smaller. In accordance with this, the arcuate grooves for holding the pipe have to be made smaller. In this case, it has been necessary to newly remake the pipe clamp and newly manufacture a mold for molding this clamp.

The invention was completed based on the above-situation and aims to improve a wire protection member.

SUMMARY

The invention relates to a wire protecting member for accommodating and protecting a wire to be routed in a vehicle inside. The wire protecting member includes an exterior material having the wire inserted therein, a clamp including an inserting portion having an inner diameter larger than the exterior material and configured to fix the exterior material to the vehicle, and an auxiliary clamp interposed between the exterior material and the inserting portion and configured to fix the exterior material to the inserting portion.

According to this configuration, it is not necessary to reduce the size of the clamp. Further, the exterior material can be fixed to the inserting portion of the clamp by the auxiliary clamp, for example, even if the size of the wire becomes smaller and the size of the exterior material becomes smaller. Thus, it is not necessary to remake the clamp and manufacture a mold for molding the clamp for smaller-diameter wires.

Existing components can be used and specification changes of the existing components can be quickly dealt with by the auxiliary clamp. Further, since the auxiliary clamp is only mounted in the inserting portion through which the exterior material is inserted, the size thereof can be suppressed to a minimum size.

The wire protecting member disclosed by this specification may be configured as follows.

The exterior material may be a bellows-like corrugated tube in which crest portions and trough portions are alternately arranged. The auxiliary clamp may include an inner peripheral projection to be fitted into the trough portion. According to this configuration, the auxiliary clamp can be positioned relative to the exterior material in the axial direction by fitting the inner peripheral projection into the trough portion. Further, a displacement of the auxiliary clamp in the axial direction can be avoided.

The auxiliary clamp may include a pair of outer peripheral projections for fixing the exterior material to the inserting portion by being held in contact with opposite axial end parts of the clamp. Accordingly, the clamp can be positioned relative to the auxiliary clamp in the axial direction by the contact of the pair of outer peripheral projections with the opposite axial end parts of the clamp. Further, a displacement of the clamp in the axial direction can be avoided.

According to the technology disclosed by this specification, existing components can be used by using an auxiliary clamp.

DETAILED DESCRIPTION

Figure 1:
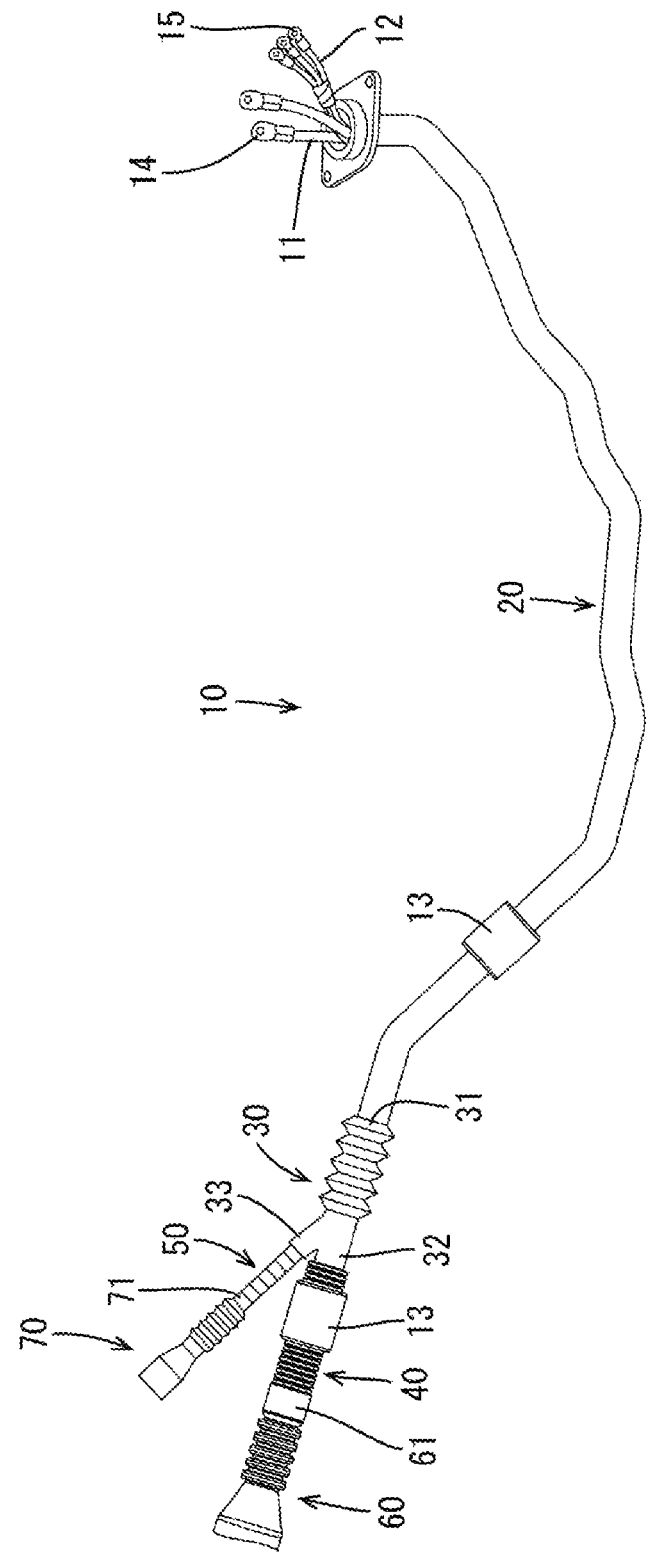
FIG. 1 is a plan view showing a wire protecting member in an embodiment.

A wire protecting member 10 according to an embodiment of the invention is described with reference to FIGS. 1 to 5. As shown in FIG. 1, the wire protecting member 10 of this embodiment includes a shield pipe 20 for accommodating and protecting a plurality of wires 11, 12. The plurality of wires includes at least one thick wire 11 and at least one thin wire 12. A forked grommet 30 is connected to an end part of the shield pipe 20. Large and small corrugated tubes 40, 50 are connected to end parts of the forked grommet 30 and large and small grommets 60, 70 connected to end parts of these corrugated tubes 40, 50.

Large and small terminals 14, 15 are connected to end parts of the large and small wires 11, 12, respectively, on a vehicle rear side (right side shown). The thick wires 11 and the large terminals 14 mounted on these wires constitute a power circuit for driving and the like. On the other hand, the thin wires 12 and the small terminals 15 mounted on these wires constitute a signal circuit for control and the like. Each wire 11, 12 is such that a core configured by twisting a plurality of electrically conductive metal strands is surrounded by an insulation coating made of synthetic resin.

The shield pipe 20 has both a shield function and a function of protecting the wires 11, 12 and is a hollow cylindrical member made of electrically conductive metal (e.g. aluminum alloy). The shield pipe 20 is bent at a plurality of positions and formed by being successively bent after the plurality of wires 11, 12 are inserted into a straight pipe. Thus, a length of the shield pipe 20 is shorter than the entire lengths of the wires 11, 12.

The forked grommet 30 is formed of a rubber member and includes a pipe-side fitting portion 31 to be fitted to an end part of the shield pipe 20 and two types of large and small tube-side fitting portions 32, 33 to be fitted to end parts of the respective corrugated tubes 40, 50. The large tube-side fitting portion 32 is fitted to the end part of the large corrugated tube 40 and the small tube-side fitting portion 33 is fitted to the end part of the small corrugated tube 50.

Figure 2:
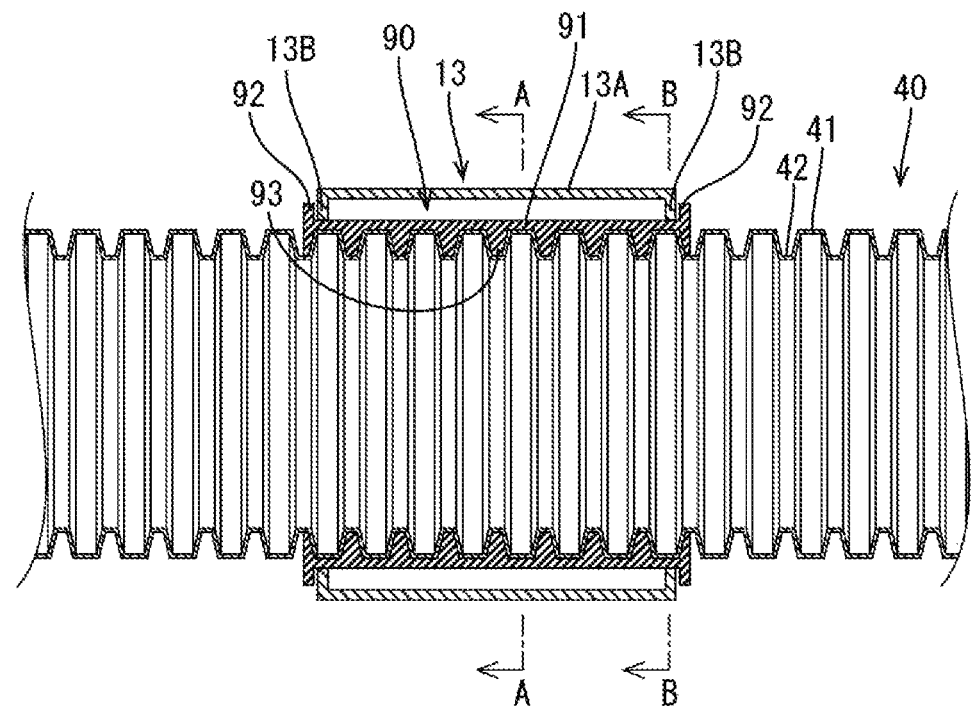
FIG. 2 is a section showing a state where an auxiliary clamp is mounted between a clamp and a corrugated tube.

The large corrugated tube 40 is made of synthetic resin and, as shown in FIG. 2, in the form of bellows in which crest portions 41 and trough portions 42 are alternately arranged. This corrugated tube 40 is not described in detail since it has the same structure as known corrugated tubes. Further, the small corrugated tube 50 has the same overall structure as the large corrugated tube 40 although having a smaller diameter. Thus, the small corrugated tube 50 is not described.

The large grommet 60 is formed of a rubber member and includes a tube-side fitting portion 61 to be fitted to the end part of the large corrugated tube 40. The small grommet 70 includes a tube-side fitting portion 71 to be fitted to the end part of the small corrugated tube 50.

The shield pipe 20 is fixed to a body of a vehicle by a clamp 13. Similarly, the large corrugated tube 40 is fixed to the body of the vehicle by a clamp 13. In this embodiment, the clamp 13 mounted on the shield pipe 20 and the clamp 13 mounted on the large corrugated tube 40 are common components.

Figure 3:
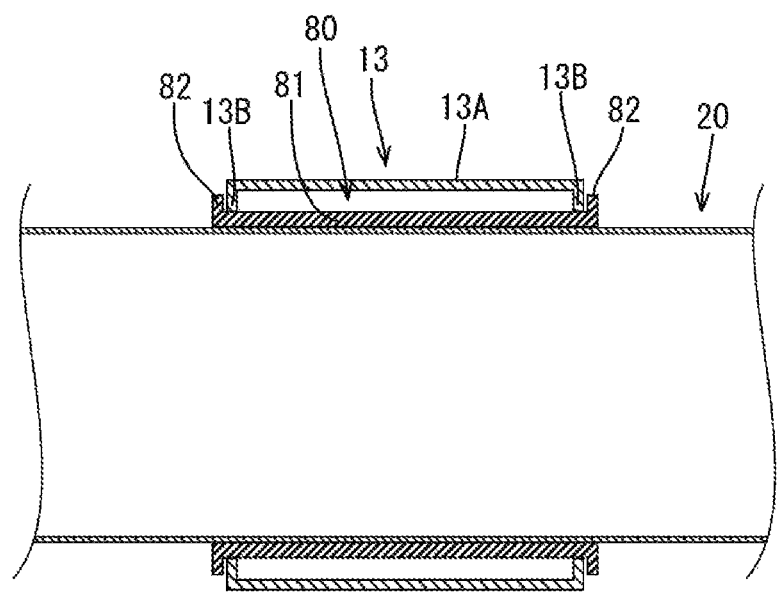
FIG. 3 is a section showing a state where an auxiliary clamp is mounted between the clamp and a shield pipe.
Figure 5:
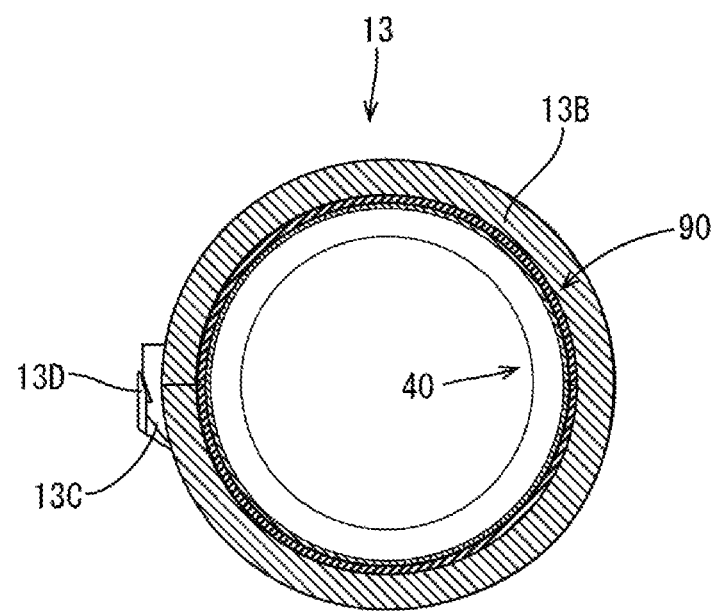
FIG. 5 is a section along B-B of FIG. 2.

The clamp 13 is made of synthetic resin and includes, as shown in FIG. 3, an inserting portion 13A having an inner diameter larger than the shield pipe 20. The inserting portion 13A has a hollow cylindrical shape and a pair of annular projections 13B are circumferentially provided on opposite axial end parts thereof. The respective annular projections 13B project radially inward from the opposite axial end parts of the inserting portion 13A and have a circular ring shape when viewed from an axial direction as shown in FIG. 5.

Figure 4:
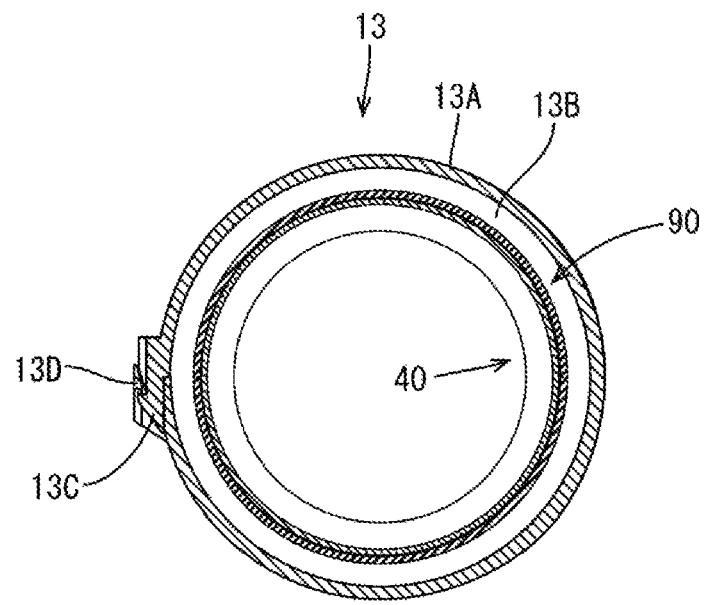
FIG. 4 is a section along A-A of FIG. 2.

As shown in FIG. 4, the clamp 13 includes a lock portion 13C and a locked portion 13D and can be opened by releasing the locking of the lock portion 13C and the locked portion 13D. In this way, the clamp 13 can be laterally mounted on the shield pipe 20 or the corrugated tube 40 and the lock portion 13C and the locked portion 13D can be locked to each other.

As shown in FIG. 3, in this embodiment, an auxiliary clamp for pipe 80 (hereinafter, abbreviated as an "auxiliary clamp 80") is interposed between the inserting portion 13A of the clamp 13 and the outer peripheral surface of the shield pipe 20. The auxiliary clamp 80 is made of a flexible rubber material and includes a hollow cylindrical tubular main body 81 and a pair of outer peripheral projections 82 circumferentially provided on opposite axial end parts of this tubular main body 81. The respective outer peripheral projections 82 project radially outwardly from the opposite axial end parts of the tubular main body 81 and have a circular ring shape when viewed from the axial direction. Note that interposition means being located between two members and being mounted to the two members. The auxiliary clamp for pipe 80 is located between the inserting portion 13A of the clamp 13 and the outer peripheral surface of the shield pipe 20 and mounted to both the inserting portion 13A of the clamp 13 and the outer peripheral surface of the shield pipe 20.

The inner peripheral edges of the annular projections 13B of the clamp 13 are in contact with the outer peripheral surface of the tubular main body 81, but the inner peripheral surface of the inserting portion 13A of the clamp 13 is not in contact with the outer peripheral surface of the tubular main body 81. Further, the inner peripheral surface of the tubular main body 81 is in contact with the outer peripheral surface of the shield pipe 20. Furthermore, each outer peripheral projection 82 is located outwardly of the corresponding annular projection 13B and in contact with the corresponding annular projection 13B, whereby the clamp 13 is positioned relative to the auxiliary clamp 80 in the axial direction and a displacement in the axial direction is suppressed.

By interposing the auxiliary clamp 80 in this way, the shield pipe 20 is fitted and fixed to the inner side of each annular projection 13B of the clamp 13 without any clearance. Accordingly, even if the size of the shield pipe 20 becomes smaller than conventional shield pipes, the shield pipe 20 can be fixed to the vehicle by using the clamp 13 for fixing the conventional shield pipes.

Next, as shown in FIG. 2, an auxiliary clamp for tube 90 (hereinafter, abbreviated as an "auxiliary clamp 90") is interposed between the inserting portion 13A of the clamp 13 and the outer peripheral surface of the corrugated tube 40. The auxiliary clamp 90 is made of a flexible rubber material and includes a hollow cylindrical tubular main body 91, a pair of outer peripheral projections 92 circumferentially provided on opposite axial end parts of this tubular main body 91 and a plurality of inner peripheral projections 93 provided on the inner peripheral surface of the tubular main body 91. An interval between the respective inner peripheral projections 93 is equal to that between the respective trough portions 42 of the corrugated tube 40. Thus, the respective inner peripheral projections 93 are fitted into the respective trough portions 42. By fitting the respective inner peripheral projections 93 into the respective trough portions 42, the auxiliary clamp 90 is positioned relative to the corrugated tube 40 in the axial direction and a displacement in the axial direction is suppressed.

The respective outer peripheral projections 92 project radially outwardly of the opposite axial end parts of the tubular main body 91 and have a circular ring shape when viewed from the axial direction. The inner peripheral edges of the annular projections 13B of the clamp 13 are in contact with the outer peripheral surface of the tubular main body 91, but the inner peripheral surface of the inserting portion 13A of the clamp 13 is not in contact with the outer peripheral surface of the tubular main body 91. Further, each inner peripheral projection 93 is located outwardly of the corresponding annular projection 13B and in contact with the corresponding annular projection 13B, whereby the clamp 13 is positioned relative to the auxiliary clamp 90 in the axial direction and a displacement in the axial direction is suppressed.

By interposing the auxiliary clamp 90 in this way, the corrugated tube 40 is fitted and fixed to the inner side of each annular projection 13B of the clamp 13 without any clearance. Accordingly, even if the size of the corrugated tube 40 becomes smaller than conventional corrugated tubes, the corrugated tube 40 can be fixed to the vehicle by using the clamp 13 for fixing the conventional corrugated tubes.

Note that since the pair of inner peripheral projections 93 located on the opposite axial end parts of the auxiliary clamp 90 are fitted into the trough portions 42 of the corrugated tube 40, water is unlikely to enter between the auxiliary clamp 90 and the corrugated tube 40 even if water directly hits the end part of the auxiliary clamp 90 when the vehicle is washed with high-pressure water.

As described above, in this embodiment, the size of the clamp 13 needs not be reduced and the corrugated tube 40 can be fixed to the inserting portion 13A of the clamp 13 by the auxiliary clamp 90, for example, even if the sizes of the wires become smaller and the size of the corrugated tube 40 becomes smaller. Thus, it is not necessary to newly remake the clamp and newly manufacture a mold for molding the clamp.

As just described, only by newly preparing the auxiliary clamp 90, existing components can be used and specification changes of the existing components can be quickly dealt with. Further, since the auxiliary clamp 90 is only mounted in the inserting portion 13A through which the corrugated tube 40 is inserted, the size thereof can be suppressed to a minimum size.

An exterior material may be the bellows-like corrugated tube 40 in which the crest portions 41 and the trough portions 42 are alternately arranged and the auxiliary clamp 90 may include the inner peripheral projections 93 to be fitted into the trough portions 42.

According to this configuration, the auxiliary clamp 90 can be positioned relative to the corrugated tube 40 in the axial direction by fitting the inner peripheral projections 93 into the trough portions 42. Further, a displacement of the auxiliary clamp 90 in the axial direction can be avoided.

The auxiliary clamp 90 may include the pair of outer peripheral projections 92 for fixing the corrugated tube 40 to the inserting portion 13A by being held in contact with the opposite axial end parts of the clamp 13. According to this configuration, the clamp 13 can be positioned relative to the auxiliary clamp 90 in the axial direction by the contact of the pair of outer peripheral projections 92 with the opposite axial end parts of the clamp 13. Further, a displacement of the clamp 13 in the axial direction can be avoided.

The technology disclosed by this specification is not limited to the above described and illustrated embodiment. For example, the following various modes are also included.

Although the auxiliary clamps 80, 90 made of the rubber material are illustrated in the above embodiment, auxiliary clamps made of a resin material may be used. Although the tubular auxiliary clamps 80, 90 are illustrated in the above embodiment, sheet-like auxiliary clamps may be used.

Although the auxiliary clamp 90 provided with the inner peripheral projections 93 to be fitted into the trough portions 42 of the corrugated tube 40 is illustrated in the above embodiment, the inner peripheral projections 93 may not be necessarily provided.

Although the auxiliary clamps 80, 90 including the pair of outer peripheral projections 82, 92 are illustrated in the above embodiment, the auxiliary clamps may include a plurality of outer peripheral projections.

Although the hollow cylindrical shield pipe 20 and the hollow cylindrical corrugated tubes 40, 50 are illustrated as the external materials in the above embodiment, rectangular tubular resin pipes may be used as the exterior materials.

LIST OF REFERENCE SIGNS

10 . . . wire protecting member
11 . . . wire
12 . . . wire
13 . . . clamp
13A . . . inserting portion
20 . . . shield pipe (exterior material)
40 . . . corrugated tube (exterior material)
41 . . . crest portion
42 . . . trough portion
50 . . . corrugated tube (exterior material)
80 . . . auxiliary clamp for pipe
82 . . . outer peripheral projection
90 . . . auxiliary clamp for tube
92 . . . outer peripheral projection
93 . . . inner peripheral projection

What is claimed:

1. A wire protecting member for accommodating and protecting a wire to be routed in a vehicle inside, comprising:
    an exterior material having the wire inserted therein, the exterior material having an outer peripheral surface with a plurality of crest portions and trough portions arranged alternatingly in an axial direction of the exterior material;
    a tubular auxiliary clamp mounted to the exterior material and in contact with the outer peripheral surface of the exterior material over an entire circumference thereof, the auxiliary clamp having an inner surface with a plurality of inwardly-facing peripheral projections spaced apart in the axial direction and configured to engage the plurality of trough portions of the exterior material, and an outer surface having first and second outwardly-facing peripheral projections provided respectively on opposite axial ends of the auxiliary clamp; and
    a clamp having an inserting portion with an inner diameter larger than an outer diameter of the exterior material and first and second annular projections provided on opposite axial ends of the inserting portion, the clamp mounted to the auxiliary clamp about an entire circumference thereof so that inner ends of the first and second annular projections are in contact with the outer surface of the auxiliary clamp and at positions axially inward of the first and second outwardly facing peripheral projections, and the inserting portion between the first and second annular projections is spaced from the auxiliary clamp.

2. The wire protecting member of claim 1, wherein the first and second outwardly-facing peripheral projections are held in contact with the first and second annular projections for fixing the exterior material to the inserting portion.

3. The wire protecting member of claim 1, further comprising a forked grommet connected to an end part of the exterior material; and
    large and small corrugated tubes connected to end parts of the forked grommet.

4. The wire protecting member of claim 3, wherein the forked grommet is a rubber member and includes a pipe-side fitting portion to be fitted to the end part of the exterior material.

5. The wire protecting member of claim 3, further comprising large and small grommets are fitted to end parts of the large and small corrugated tubes, respectively.

6. The wire protecting member of claim 1, wherein the exterior material is a hollow cylindrical member made of electrically conductive metal.

7. The wire protecting member of claim 1, wherein the clamp includes a lock portion and a locked portion for laterally mounting and locking the clamp to the exterior material.

8. A wire protecting member for accommodating and protecting a wire to be routed in a vehicle inside, comprising:
    an exterior material having the wire inserted therein, the exterior material having an outer peripheral surface;
    a tubular auxiliary clamp mounted to the exterior material and in contact with the outer peripheral surface of the exterior material over an entire circumference thereof, the auxiliary clamp including an outer surface having first and second outwardly-facing peripheral projections provided respectively on opposite axial ends of the auxiliary clamp; and
    a clamp having an inserting portion with an inner diameter larger than an outer diameter of the exterior material and first and second annular projections provided on opposite axial ends of the inserting portion, the clamp mounted to the auxiliary clamp about an entire circumference thereof so that inner ends of the first and second annular projections are in contact with the outer surface of the auxiliary clamp and at positions axially inward of the first and second outwardly-facing peripheral projections, and the inserting portion between the first and second annular projections is spaced from the auxiliary clamp.

9. The wire protecting member of claim 8, further comprising a forked grommet connected to an end part of the exterior material; and large and small corrugated tubes connected to end parts of the forked grommet.

10. The wire protecting member of claim 9, wherein the forked grommet is a rubber member and includes a pipe-side fitting portion to be fitted to the end part of the exterior material.

11. The wire protecting member of claim 9, further comprising large and small grommets are fitted to end parts of the large and small corrugated tubes, respectively.

12. The wire protecting member of claim 8, wherein the exterior material is a hollow cylindrical member made of electrically conductive metal.

13. The wire protecting member of claim 8, wherein the clamp includes a lock portion and a locked portion for laterally mounting and locking the clamp to the exterior material.

14. A wire protecting member for accommodating and protecting a wire to be routed in a vehicle inside, comprising:

an exterior material having the wire inserted therein, the exterior material including at least one first section having an outer peripheral surface with a plurality of crest portions and trough portions arranged alternatingly in an axial direction of the exterior material and at least one second section having a continuous outer peripheral surface;

at least one first auxiliary clamp mounted to the at least one first section of the exterior material, the at least one first auxiliary clamp having an inner surface with a plurality of inwardly-facing peripheral projections spaced apart in the axial direction and configured to engage the plurality of trough portions of the exterior material, and an outer surface having first and second outwardly-facing peripheral projections provided respectively on opposite axial ends of the at least one second auxiliary clamp;

at least one second auxiliary clamp mounted to the at least one second section of the exterior material, the at least one second auxiliary clamp including an outer surface having first and second outwardly-facing peripheral projections provided respectively on opposite axial ends of the at least one second auxiliary clamp; and a plurality of clamps, each of the plurality of clamps having an inserting portion with an inner diameter larger than an outer diameter of the exterior material and first and second annular projections provided on opposite axial ends of the inserting portion, the plurality of clamps mounted to the at least one first auxiliary clamp and the at least one second auxiliary clamp so that inner ends of the first and second annular projections are in contact with the outer surface of the at least one first auxiliary clamp and the at least one second auxiliary clamp, and the inserting portion between the first and second annular projections is spaced from the at least one first auxiliary clamp and the at least one second auxiliary clamp.

* * * * *